Dec. 22, 1970  J. CECIL, JR  3,548,464
ROD CLAMP DEVICE
Filed Feb. 28, 1969
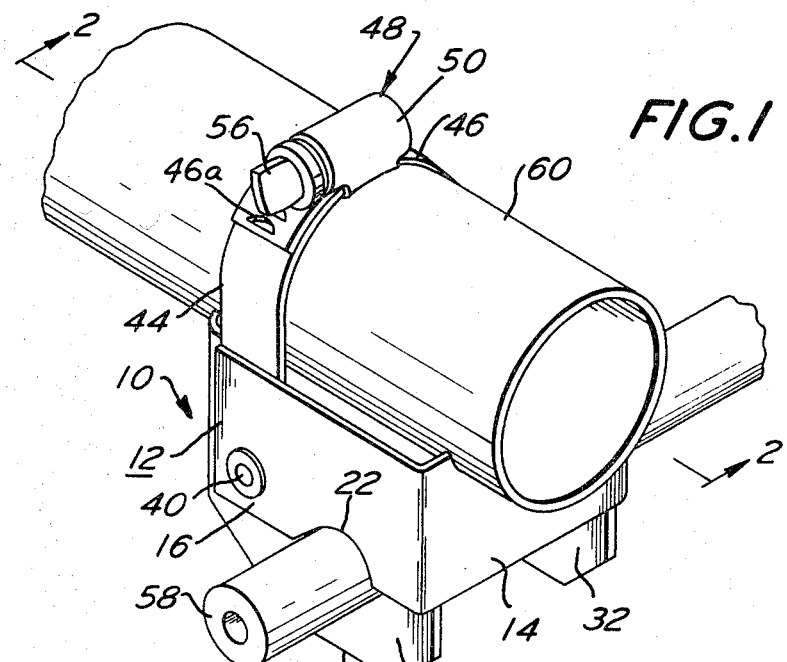
FIG.1
FIG.2
FIG.3
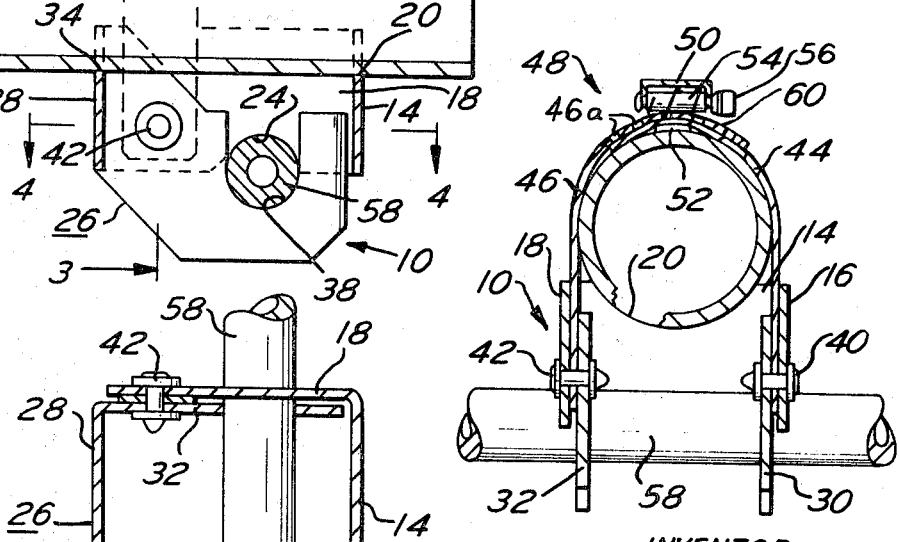
FIG.4
INVENTOR
JOHN CECIL, JR.
BY
Jacob Trachtman
ATTORNEY 3,548,464
ROD CLAMP DEVICE
John Cecil, Jr., Skaneateles, N.Y., assignor to American Electronic Laboratories, Inc., Colmar, Pa., a corporation of Pennnsylvania
Filed Feb. 28, 1969, Ser. No. 803,171
Int. Cl. A44b 21/00
U.S. Cl. 24—81         8 Claims

ABSTRACT OF THE DISCLOSURE

A clamp for rigidly joining two rods or tubes in non-coplanar relation which has a single actuating means which simultaneously fastens the two rods or tubes to the clamp. The clamp includes a supporting member, a clamp member pivotally connected to the supporting member and extending along one side of the supporting member, clamping strap means secured to the supporting member and extending across the other side of the supporting member, and actuating means for tightening the clamping strap means around a rod or tube. One rod or tube extends between the clamping member and the supporting member, and a second rod or tube extends between the clamping strap means and the supporting member and engages a portion of the clamping member. When the clamping strap means is tightened around the second rod or tube to secure it to the supporting member, the second rod or tube presses against the clamping member. This pivots the clamping member so as to clamp the first rod or tube between the clamping member and the supporting member.

---

The present invention relates to a clamp for rigidly joining two rods in non-coplanar relation, and more particularly to a clamp having a single actuator which simultaneously fastens the two rods to the clamp. As used here throughout, the term "rod" means both a solid rod and a hollow tube.

There are many types of structural devices, such as guard rails, fencing, scaffolding, radio and television antenna and the like, which require the clamping together of two rods in non-coplanar relation. The clamps that are presently used for this purpose generally include a separate fastener means for each rod. Such clamps are not only bulky in size, but also require two separate tightening operations to rigidly secure the rods together. Also, if the structural device is a temporary one, such as a scaffold, there is required two separate operations to completely disassemble the connections between the rods and the clamp.

It is therefore an object of the present invention to provide a novel clamp for rigidly joining two rods in non-coplanar relation, to provide a clamp for rigidly joining two rods in non-coplanar relation which has a single actuator for simultaneously fastening both rods to the clamp, and to provide a clamp which does not require free rod ends for application of the clamp.

These objects are achieved by a clamp having a U-shaped supporting member, a U-shaped clamping member pivotally mounted between the arms of the supporting member with the base of the clamping member extending across the arms of the supporting member and the arms of the clamping member extending along one side of the arms of the supporting member, a clamping strap means secured to the supporting member and extending between the arms of the supporting member at the other side of the supporting member arms, and means for tightening the clamping strap means around a rod.

A first rod is positioned across the arms of the clamping member between the arms of the clamping member and the arms of the supporting member. A second rod is positioned within the clamping strap means and is seated on the base of the clamping member and the base of the supporting member. When the tightening means for the clamping strap means is actuated to tighten the clamping strap means around the second rod, the second rod is pressed against the base of the supporting member and the base of the clamping member. This causes the clamping member to pivot with respect to the supporting member so that the arms of the clamping member press the first rod against the arms of the supporting member. Thus, by a single tightening operation both rods are simultaneously fastened together by the clamp.

For the purpose of illustrating the invention there is shown in the drawings a form which is presently preferred; it being understood, however, that this invention is not limited to the precise arrangements and instrumentalities shown.

FIG. 1 is a perspective view of the clamp of the present invention.

FIG. 2 is a sectional view of the clamp taken along line 2—2 of FIG. 1.

FIG. 3 is a sectional view of the clamp taken along line 3—3 of FIG. 2.

FIG. 4 is a sectional view of the clamp taken along line 4—4 of FIG. 2.

Referring to the drawings, the clamp of the present invention is generally designated as 10. Clamp 10 comprises a U-shaped supporting member 12 having a base 14 and a pair of spaced, parallel arms 16 and 18 extending perpendicularly from opposite edges of the base 14. The base 14 has an arcuate notch 20 in its edge at one side of the supporting member 12. The arms 16 and 18 have arcuate notches 22 and 24 respectively in their edges at the opposite side of the supporting member 12.

A U-shaped clamping member 26 is carried by the supporting member 12. The clamping member 26 has a base 28 and a pair of spaced, parallel arms 30 and 32 extending perpendicularly from opposite edges of the base 28. The clamping member 26 is mounted on the supporting member 12 with the base 28 of the clamping member extending between the free ends of the arms 16 and 18 of the supporting member and parallel to the base 14 of the supporting member. The arms 30 and 32 of the clamping member 26 extend along the inner surfaces of the arms 16 and 18 respectively of the supporting member toward the base 14 of the supporting member, and project beyond the side edge of the supporting member which has the notches 22 and 24. The clamping member base 28 has an arcuate notch 34 in its side edge which is in alignment with the notch 20 in the supporting member base 14. The clamping member arms 30 and 32 have notches 36 and 38 respectively in their side edges which are within the supporting member arms 16 and 18. The notches 36 and 38 in the clamping member arms 30 and 32 mate respectively with the notches 22 and 24 in the supporting member arms 16 and 18.

The clamping memper 26 is pivotally secured to the supporting member 12 by a pair of aligned rivets 40 and 42. The rivet 40 extends through the clamping member arm 30 and the supporting member arm 16 adjacent the free end of the supporting member arm. The rivet 42 extends through the supporting member arm 18 and the clamping member arm 32 adjacent the free end of the supporting member arm.

A clamping strap 44 is pivotally secured at one end to the supporting member arm by the rivet 40, and a clamping strap 46 is pivotally secured at one end to the supporting member arm 18 by the rivet 42. The clamping straps 44 and 46 extend away from the clamping member 26 and project beyond the side edge of the supporting member 12. The clamping strap 46 has a plurality of openings 46a therethrough which are spaced longitudinally along the clamping strap 46.

A tightening means 48 is attached to the free end of the clamping strap 46. Tightening means 48 comprises a semi-cylindrical housing 50 having a flat plate 52 extending across the center portion of the open side of the housmoved with respect to the clamping strap 46 is moved of the flat plate 52. A threaded shaft 54 extends longitudinally along the interior of the housing 50 and is rotatably supported in the end walls of the housing. A knob 56 is provided on one end of the shaft 54 outside of the housing 50 by which the shaft can be rotated. The free end of the clamping strap 44 extends through the openings into the housing 50 across the interior surface of the flat plate 52 and is secured to the flat plate 52 so as to attach the tightening means 48 to the clamping strap 44. The free end of the clamping strap 46 extends through the openings into the housing 50 and over the free end of the clamping strap 44. The threads of the shaft 54 fit into the openings 46a in the clamping strap 46 so that upon rotation of the shaft 54, the clamping strap 46 is moved with respect to the clamping strap 44 to tighten or loosen the clamping straps 44 and 46 around a rod.

In the use of the clamp 10 to fasten together two rods 58 and 60, one of the rods 58 is inserted through the notches 36 and 38 in the clamping member arms 30 and 32 respectively so that the rod 58 extends across the clamping member arms and is between the clamping member arms 30 and 32 and the supporting member arms 16 and 18. The other rod 60 is placed between the clamping straps 44 and 46, and is seated in the notches 20 and 34 in the supporting member base 14 and the clamping member base 28 respectively. The knob 56 of the lightening means 48 is rotated to rotate the shaft 54 so as to tighten the clamping straps 44 and 46 around the rod 60 and thereby fasten the rod 60 against the supporting member base 14 and the clamping member base 28. The force of the rod 60 against the clamping member base 28 pivots the clamping member 26 with respect to the supporting member 12. This pivotation of the clamping member 26 forces the clamping member arms 30 and 32 against the rod 58 so as to tightly fasten the rod 58 between the clamping member arms 30 and 32 and the supporting member arms 16 and 18. Thus, the single tightening operation which tightens the clamping straps 44 and 45 around the rod 60 simultaneously fastens both rods 58 and 60 to the clamp 10 so as to rigidly fasten the rods together.

Although the clamp 10 is shown as having the tightening means 48 for tightening the clamping straps 44 and 46 around the rod 60, it should be understood that any well known tightening means can be used for this purpose. Also, although the rods are shown as being connected by the clamp 10 at right angles with respect to each other, the angle between the rods can be varied by changing the position of the notches in the arms of the clamping member and supporting member so that the rod 58 extends across the arms of the clamping member and supporting member at an angle other than 90 degrees with respect to said arms. In addition, rods of any cross-sectional shape can be connected together by the clamp 10 of the present invention.

Thus, there is provided by the present invention a clamp for rigidly fastening together two rods in non-coplanar relation which has only a single actuating means for simultaneously securing both rods to the clamp. This provides for greater ease of assembling and disassembling the rods, particularly when the junction is in a relatively inaccessible position. Also, the clamp of the present invention is formed of a minimum number of parts which are easy to assemble so that the clamp is relatively inexpensive to manufacture.

The present invention may be embodied in other specific forms without departing from the spirit or essential attributes thereof and, accordingly, reference should be made to the appended claims, rather than to the foregoing specification as indicating the scope of the invention.

What is claimed is:

1. A clamp for rigidly joining two rods in non-coplanar relation comprising a supporting member having first and second sides, a clamping member pivotably secured to said supporting member, said clamping member having a first portion extending along one side of the supporting member and another portion at the other side of the supporting member, clamping strap means secured to the supporting member and extending over the other side of said supporting member, and means for tightening said clamping strap means around a rod, said clamp receiving one rod between the first portion of said clamping member and the one side of the supporting member and a second rod between the clamping strap means and the other side of the supporting member with said second rod engaging the other portion of the clamping member so that upon tightening of said clamping strap means around the second rod to secure the second rod to the supporting member the engagement of the second rod with the clamping member causes the clamping member to pivot and fasten the first rod between the clamping member and the supporting member.

2. A clamp in accordance with claim 1 in which the supporting member is substantially U-shaped having a base and a pair of spaced parallel arms extending from the base, and the clamping member is pivotally mounted on the arms of the supporting member with the other portion of the clamping member extending between the arms of the supporting member.

3. A clamp in accordance with claim 2 in which the clamping member is substantially U-shaped having a base and a pair of spaced parallel arms extending from the base, the clamping member being pivotally mounted on the supporting member arms with the base of the clamping member extending between the ends of the supporting member arms and the arms of the clamping member extending along the inner surfaces of the supporting member arms toward the supporting member base and projecting beyond the one side edge of the supporting member.

4. A clamp in accordance with claim 3 in which the clamping straps means comprise a first clamping strap secured at one end to one arm of the supporting member and a second clamping strap secured at one end to the other arm of the supporting member, said clamping straps extending away from the clamping member and beyond the other side edge of the supporting member, and the tightening means engages the clamping straps so as to bring the clamping straps together over the space between the supporting member arms.

5. A clamp in accordance with claim 4 including a pair of aligned pivot pins connecting the clamping member and the clamping straps to the supporting member, one of said pivot pins extending through one arm of the supporting member, one arm of the clamping member and one of the clamping straps, and the other pivot pin extending through the other arm of the supporting member, the other arm of the clamping member and the other clamping strap.

6. A clamp in accordance with claim 5 in which the pivot pins are positioned adjacent the free ends of the arms of the supporting member.

7. A clamp in accordance with claim 6 in which each of the arms of the clamping member has a notch in its side edge which is adjacent the arms of the supporting member, and each of the arms of the supporting member has a notch in its edge which is adjacent the arms of the clamping member, each of the notches in the supporting member arms being in opposed mating relation with a notch in the clamping member arms and the pairs of mating notches for receiving a rod which is to be secured between the clamping member and the supporting member.

8. A clamp in accordance with claim 7 in which one base of the clamping member has an edge with a notch and the base of the supporting member has an edge with a notch, the notches of the bases of said clamping member and supporting member being in alignment for receiving a rod therein which is to be engaged by said clamping straps.

References Cited

FOREIGN PATENTS

| 1,205,342 | 11/1965 | Germany | 24—81 |
| 880,273 | 10/1961 | Great Britain | 24—81 |

DONALD A. GRIFFIN, Primary Examiner